June 2, 1964  I. R. GRAINGER  3,135,396
MANIPULATING APPARATUS
Filed Jan. 9, 1961  2 Sheets-Sheet 1
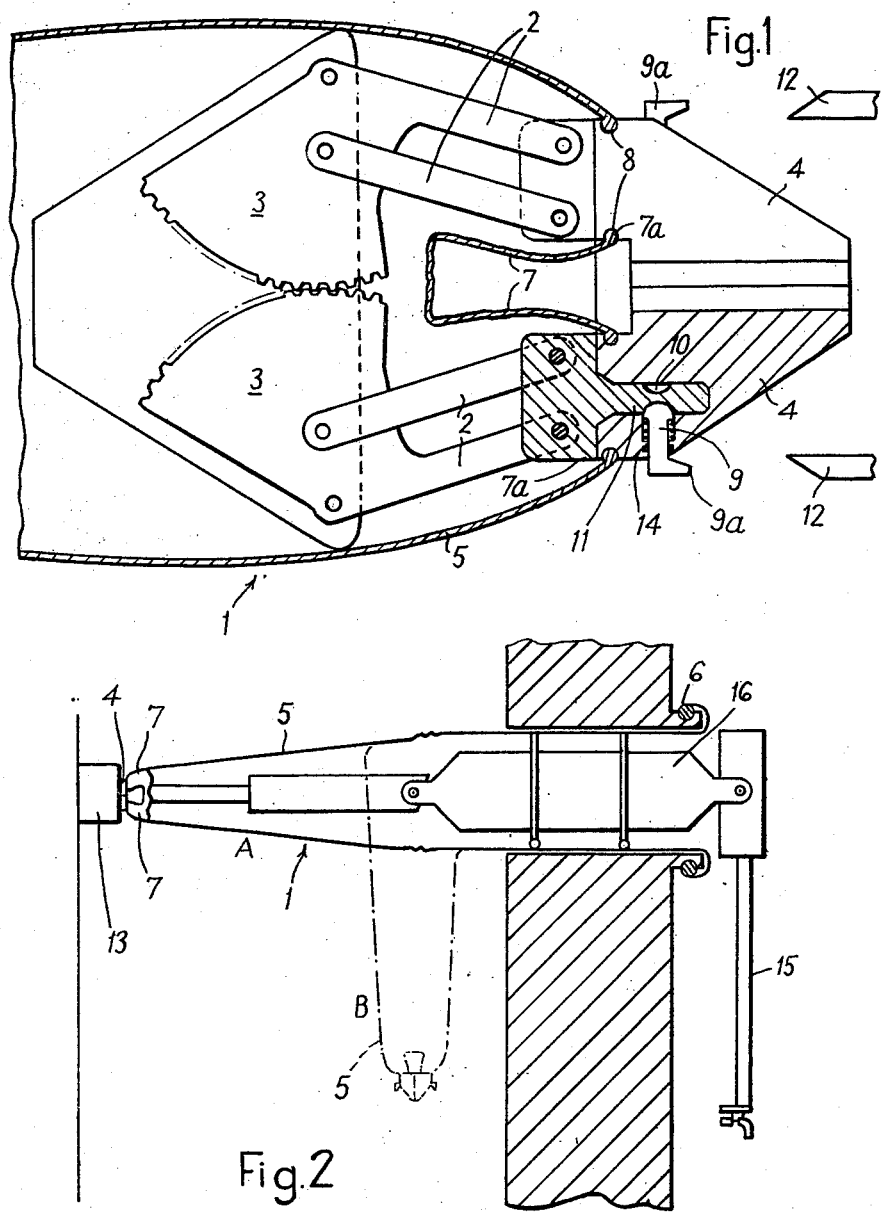
Inventor
*I. R. Grainger*
By
*Attorneys*

June 2, 1964  I. R. GRAINGER  3,135,396
MANIPULATING APPARATUS
Filed Jan. 9, 1961  2 Sheets-Sheet 2
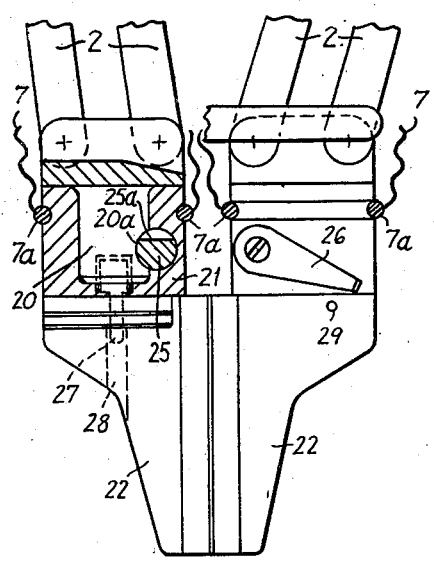
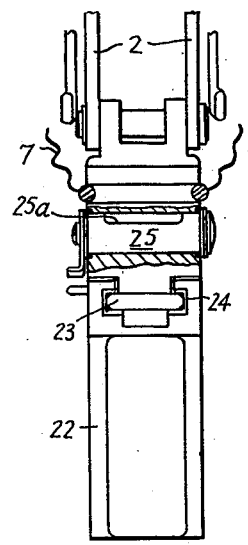
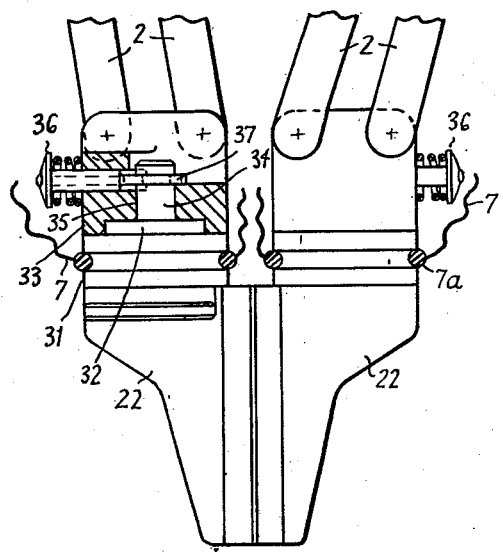
Inventor
I. R. Grainger United States Patent Office 3,135,396
Patented June 2, 1964

3,135,396
MANIPULATING APPARATUS
Irvin R. Grainger, Cambridge, England, assignor to Pye Limited, Cambridge, England, a British company
Filed Jan. 9, 1961, Ser. No. 81,451
Claims priority, application Great Britain Jan. 15, 1960
15 Claims. (Cl. 214—1)

This invention relates to manipulating apparatus for the remote handling of objects, such as radioactive materials, and consisting of a pivoted master arm provided with controls which together with the arm can be manipulated by an operator and so move a slave arm and a manipulating tool carried thereby in a corresponding manner. When used for handling radioactive material in a cell the manipulators are constructed with both the master and slave arms pivoted to a through-tube extending through a wall of the cell and constituting a shield separating and protecting the operator from the radioactive material to be handled and are arranged adjacent to a transparent radiation-proof viewing window or a television picture monitor, so that the operator can view the material in the cell and the manipulations performed by the slave arm and tools. An operator can operate a separate manipulator with each hand. The arms are usually pivoted relative to the through-tube so that they can move in a plane normal to the plane of the cell wall towards and away from the wall and can also move through a plane parallel to the wall by a turning movement of the arms and tube together about the axis of the tube.

In such manipulating devices it is known to enclose the slave arm of the manipulator in a flexible bag, for example of a plastic material, which also extends through the through-tube and is sealed outside the cell wall, this bag serving to prevent the leakage of radioactive dust particles and the like from the cell through the manipulator aperture. In order to allow the slave arm of the manipulator to be removed for servicing and to allow the bags to be changed, hitherto the slave arm of the manipulator has been connected to the manipulating tool by means of an extension or wrist piece to which the bag is attached and which includes a releasable connection allowing the slave arm to be released for withdrawal, leaving the bag and the extension piece as well as the manipulating tool within the cell. However, this extension piece adds about 5 inches to the length of the slave arm of the manipulator and approximately doubles the moment of the slave arm. The manipulator is therefore only capable of lifting about half of the weight which it can handle without this extension piece and also its sensitivity is reduced by about half. Moreover with this construction it is not possible to re-engage the releasable connection of the extension piece and hence it is not possible to re-insert the slave arm of a manipulator into an existing bag after it has been withdrawn for servicing but it is necessary to fit a new bag with a new extension piece and manipulating tool, the previous bag, extension piece and tool being discarded on the floor within the cell. Although these parts can be recovered, they have to be decontaminated and they may therefore be unusable for a long time. Furthermore when the slave arm is withdrawn from the cell, the seal at the extension piece is no longer complete and radioactive dust particles may escape.

It is an object of the present invention to provide improvements which substantially reduce or avoid at least some of the aforementioned disadvantages.

According to the present invention the extension piece is dispensed with and the bag is attached at or adjacent the manipulating tool, or to the members which receive the tools in the case of a manipulator having facilities for interchanging manipulating tools. A releasable connection is provided adjacent the tool or tool receiving members which can be remotely actuated from outside the cell so that when the slave arm of a manipulator is withdrawn only the manipulating tool, as well as the tool receiving members if provided, and the bag are left within the cell.

According to a feature of the invention the end of the bag adapted to be attached at or adjacent the manipulating tool of the manipulator is formed with two finger portions open at their extremity, each of which fits over the mechanism working one part of the manipulating tool and which then form a seal around its extremity. It will be appreciated that the tools generally comprise two cooperating parts forming tongs, scissors, or similar mechanisms.

The invention therefore also provides a bag of flexible material for receiving the slave arm of a manipulator wherein its end adjacent the manipulating tool is formed with at least two fingers open at their extremity.

According to a further feature of the invention the releasable connection comprises spring pressed members which are normally urged by spring pressure to a position in which they hold the parts in interlocking relationship but which can be operated so as to enable the slave arm actuating mechanisms to be disconnected from the manipulating tool or tool receiving members when it is desired to remove the slave arm of the manipulating device from the bag. In order to facilitate releasing the connection, the wall of the cell opposite the manipulator may be provided with means for receiving and supporting the manipulating tool or tools as well as a member for acting on the spring pressed members to allow disengagement of the actuating mechanism for the slave arm from the manipulating tool or tool receiving members.

With the construction according to the present invention there is no reduction in the weight handling capacity of the manipulator or in its sensitivity, due to the elimination of the extension piece. Moreover when it is necessary to change the bags the only parts discarded within the cell are the previous bag and the manipulating tool carried thereby, or the member for receiving such tools where interchangeable tools are employed. Furthermore with the construction according to the present invention it is possible to reconnect the slave arm of the manipulator to a manipulating tool and therefore it is not necessary to provide a new bag each time the manipulator is withdrawn from the cell for servicing.

The invention will now be further described with reference to the accompanying drawings in which:

FIGURE 1 is a diagram illustrating one embodiment of the actuating mechanism of the slave arm of a manipulator provided with a bag arrangement according to the present invention, FIGURE 2 is a diagram generally illustrating the manipulator arrangement within a cell.

FIGURES 3a and 3b show another embodiment, and

FIGURE 4 illustrates a further embodiment.

Referring to FIGURE 1, the slave arm of the manipulator 1 is provided with an actuating mechanism including linkages 2 operated by toothed quadrants 3 for closing and opening the jaws 4 forming a gripping tool. The mechanism is operated in a known manner by means of wire or tapes which extend up the slave arm of the manipulator to the controls operated by an operator on the master arm. A plastic bag 5 for example of polyvinylchloride, encloses the slave arm of the manipulator and extends through the through-tube and is sealed adjacent the end of the through-tube outside the cell, as is shown at 6 in FIGURE 2. The bag is provided with two fingers 7, each of which fits over one of the actuating linkages and is provided at its open extremity with a bead 7a which fits within a groove 8 on the associated jaw 4 to form a seal. The jaws are releasably secured to the manipulating mechanism by means of spring pressed plunger 9, one for each jaw, only one plunger being visible in the drawing. Each plunger 9 engages in an annular groove 10 in a stud 11 which is carried by the end of the actuating mechanism and extends into a cavity in one jaw. A sealing gasket 14 is provided around each stud.

When it is desired to remove the slave arm of the manipulator for servicing or for replacing the bag, the arm of the manipulator is raised to a horizontal position and the tool engaged in a support 13 (FIGURE 2) provided in the wall of the cell opposite the manipulator. This support consists of a member or socket to receive the jaws and as the jaws are inserted therein an inclined ramp indicated at 12 in FIGURE 1 engages with the extension 9a of each plunger and urges it to a position out of engagement with the groove 8 thereby allowing each stud 11 to be withdrawn from each jaw 4 and hence the slave arm and its actuating mechanism to be withdrawn from the manipulator for servicing. The jaws 4 are retained by the support 13. If the bag is to be replaced, a new bag carrying the manipulating tool is fitted on to the slave arm of the manipulator before it is reinserted into the cell, the previous bag then being discarded upon the cell floor. This operation is carried out generally according to techniques known in the art. If it is desired to replace the slave arm into the same bag, the mechanism associated with the support 13 is such that it enables the studs 11 to be relocated in the jaws 4 and the plungers 9 re-engaged with the grooves 10 in the studs 11 to lock the jaws to the slave arm of the manipulator. The tool is then removed from the support 13 ready for operation.

FIGURE 2 shows the general arrangement of the manipulating device within the cell, the slave arm being shown in full lines in the horizontal position A with the tool 4 engaged in the support 13 ready for removing the slave arm of the manipulator. The broken line position B indicates the normal position of the manipulator when it is ready for operation. The master arm of the manipulator is shown at 15 outside the cell and the through-tube is shown at 16.

FIGURES 3a and 3b show respectively a front view and a side view of the operating portion of the slave arm of a manipulator according to another embodiment of the invention. In this embodiment the linkages 2 of the slave arm actuating mechanism are releasably connected by means of spigots 20 to tool receiving members 21 to which tools, shown in the present case as jaws 22, are in turn releasably connected by means of a key and slot arrangement 23, 24. The finger portions 7 of the plastic bag are provided with beads 7a which fit within grooves extending around the tool receiving members to form a seal.

The spigots 20 carried from the ends of the actuating linkages 2 engage in recesses in the tool receiving members. Only the connection to one member is shown in section in FIGURE 3a but the connection to the other member is similar. A cut-away portion 20a of the spigot is engaged by a spindle cam 25 controlled by an operating lever 26 arranged externally of the tool receiving member. The arrangement is such that in the position shown in FIGURE 3a, the cam locks the spigot in position in its recess, but if the cam is rotated by turning the lever 26 so that the flat 25a is in line with the periphery of the spigot 20, then it will be obvious that the spigot can be disengaged from the tool receiving member.

The key and slot connection between each jaw and the tool receiving member also includes a spring loaded locking pin 27 in order to lock the jaws on the tool receiving member. One of these pins 27 is shown in broken lines in FIGURE 3a. The tools are released from the tool receiving members 21 when it is desired to remove them or change them for other tools, by inserting the jaws 22 in a rack on the wall of the cell. This rack includes release pins which extend into holes 28 in the jaws 22 as they are inserted into the rack to depress the locking pins 27 sufficiently to allow the tool receiving members to be disengaged from the jaws by sideways movement. This sideways movement is effected by opening the handgrip on the master arm of the manipulator as is done when it is desired to open the jaws. It is now possible to engage further tools on the tool receiving members, these further tools being selected from other tool racks provided on the cell wall.

When it is desired to remove the slave arm of the manipulator for servicing, the tools are first removed in the manner described above and the slave arm of the manipulator is then raised horizontally so that the tool receiving members 21 are engaged in a support similar to 13 in FIGURE 2. The tool receiving members are inserted in the support when they are lying adjacent each other, i.e. in the "hand closed" position, and the handgrip on the master arm is now opened which causes the tool receiving members to move apart and the operating levers 26 to engage with abutments to rotate the spindle cams 25 and thereby release the spigots 20 to allow the slave arm actuating mechanism to be withdrawn from the tool receiving members and the enclosing bag.

The locking pins are provided with a sealing gasket and the spindle cams also have a sealing ring adjacent each end so that there is no danger of leakage of radioactive dust from the cell when the slave arm of the manipulator is withdrawn.

The arrangement for fitting the jaws 22 on the tool receiving members ensures that maximum gripping pressure can be applied during normal working of the manipulator without any risk of the jaws tending to slip. The spindle cam operating levers are prevented from accidental rotation during normal working of the manipulator by providing stop pins 29 on the jaws.

FIGURE 4 is a view, similar to FIGURE 3a, showing the manipulating end of the slave arm of a further embodiment according to this invention. In this embodiment, which also includes tool receiving members 31 allowing for the interchanging of tools on the slave arm, the jaws 22 or other tools are attached to the tool receiving members in the same manner as described with reference to FIGURE 3a. However in this embodiment the tool receiving members are each provided with a portion 32 of square section which enters into a corresponding recess provided in the end portion 33 of the linkages 2. A spigot 34 extends from the square section portion 32 into a further corresponding recess 35 in the end portion 33. A spring pressed plunger 36 projects from the side of each tool receiving member and carries a locking plate 37 which is normally urged by the spring so that it engages with a reduced diameter portion on the spigot 34 thereby locking the tool receiving members 33 to the slave arm linkage mechanism.

When it is desired to remove the slave arm of the manipulator, the tool receiving members are engaged with the support on the cell wall as previously described, but in this case the support includes ramps, somewhat similar to the ramps in FIGURE 1, which are positioned to engage with the plungers 36 through the fabric of the bag. If the handgrip on the master arm is now opened to cause the tool receiving members to move apart, the plungers are depressed to cause each locking plate 37 to move out of engagement with the reduced portion of the spigot 34 and position an enlarged hole in each locking plate in line with the spigots, thereby enabling the slave arm of the manipulator to be withdrawn from the tool receiving members which are left attached to the support. It will be seen that with this embodiment the mechanism for releasing the tool receiving members from the slave arm linkage is totally enclosed within the fingers 7 of the plastic bag.

While particular embodiments have been described, it will be understood that various modifications may be made without departing from the scope of this invention as defined in the claims.

I claim:

1. The combination of a chamber wherein the remote handling of objects can be carried out and manipulating apparatus for performing said remote handling operations, said manipulating apparatus comprising a through-tube extending through a wall of said chamber, a master arm pivoted at one end of said through-tube outside said chamber and carrying controls which together with the arm can be manipulated by an operator, a slave arm pivoted at the other end of said through-tube within said chamber, a manipulating tool detachably carried by said slave arm, control means extending through said through-tube to said slave arm so that it together with the manipulating tool can be controlled from the master arm by the operator, a bag of flexible material enclosing the slave arm of the manipulator, said bag being attached at one of its ends adjacent the through-tube and being attached at its other end to the manipulating tool carried by the slave arm, a releasable connection between the tool and the slave arm, a tool receiving support within said chamber positioned so that the slave arm can move to locate a tool carried thereby in said support and means for actuating said releasable connection when the tool is located in said support so that the slave arm of the manipulator can be withdrawn from the bag which remains attached at its other end to the manipulating tool.

2. The combination of a chamber wherein the remote handling of objects can be carried out and manipulating apparatus for performing said remote handling operations, said manipulating apparatus comprising a through-tube extending through a wall of said chamber, a master arm pivoted at one end of said through-tube outside said chamber and carrying controls which together with the arm can be manipulated by an operator, a slave arm pivoted at the other end of said through-tube within said chamber, tool receiving means detachably carried by said slave arm and adapted to receive a manipulating tool releasably attached to said tool receiving means, control means extending through said through-tube to said slave arm so that it together with the manipulating tool can be controlled from the master arm by the operator, a bag of flexible material enclosing the slave arm of the manipulator, said bag being attached at one of its ends adjacent the through-tube and being attached at its other end to the tool receiving means, a releasable connection between the tool receiving means and the slave arm, a support within said chamber positioned so that the slave arm can move to locate the tool receiving means carried thereby in said support, and means for actuating said releasable connection when the tool receiving means is located in said support so that the slave arm of the manipulator can be withdrawn from the bag which remains attached at said other end to the tool receiving means.

3. Manipulating apparatus comprising a through tube, a master arm and a slave arm positioned at opposite ends thereof and operatively connected to each other through said through tube, tool receiving means carried by said slave arm, control means connected to said master arm by means of which said master and slave arms can be manipulated by an operator to move a manipulating tool carried by the tool receiving means on the slave arm, a flexible bag enclosing the slave arm, said bag being attached at one end adjcent the through tube and at its other end to said tool receiving means, a releasable connection between the slave arm and tool receiving means, and means for actuating said releasable connection so that the slave arm of the manipulator can be withdrawn from the bag, which then remains attached to said tool receiving means.

4. Apparatus as claimed in claim 3, in which said other end of the bag is attached to members which are adapted detachably to receive tools whereby the manipulator has facilities for interchanging manipulating tools.

5. Apparatus as claimed in claim 4, wherein the detachable connection between the tool receiving members and the tools comprises key and slot connections and a locking pin for holding said tools secured to said tool receiving members.

6. Apparatus as claimed in claim 3, in which said tool receiving means comprises two relatively movable parts and said slave arm carries actuating mechanism therefor and the end of the bag attached to the tool receiving means is formed with two finger portions open at their extremities each of which fits over the mechanism actuating one part of the manipulating tool.

7. Apparatus as claimed in claim 3, in which the releasable connection between the slave arm and the tool receiving means comprises spring pressed members which are normally urged by spring pressure to a position in which they hold said slave arm and tool receiving means in interlocking relationship but which can be operated so as to enable the slave arm to be disconnected from the tool receiving members.

8. Apparatus as claimed in claim 3, in which the releasable connection between the slave arm and the tool receiving means comprises cam devices which normally hold said slave arm and tool receiving means in interlocking relationship but which can be moved to a position to enable the slave arm to be disconnected from the tool receiving members.

9. Manipulating apparatus for the remote handling of objects comprising a through-tube, a master arm pivoted at one end of said through-tube and carrying controls which together with the arm can be manipulated by an operator, a slave arm pivoted at the other end of said through-tube, a manipulating tool detachably carried by said slave arm, control means extending through said through-tube to said slave arm so that it together with the manipulating tool can be controlled from the master arm by the operator, a bag of flexible material enclosing the slave arm of the manipulator, said bag being attached at one of its ends adjacent the through-tube and being attached at its other end to the manipulating tool carried by the slave arm, and a releasable connection between the tool and the slave arm, and means for actuating the releasable connection so that the slave arm can be withdrawn from the bag which remains attached at said other end to the manipulating tool.

10. Manipulating apparatus for the remote handling of objects comprising a through-tube, a master arm pivoted at one end of said through-tube and carrying controls which together with the arm can be manipulated by an operator, a slave arm pivoted at the other end of said through-tube, tool receiving means detachably carried by said slave arm and adapted to receive a manipulating tool releasably attached to said tool receiving means, control means extending through said through-tube to said slave arm so that it together with the manipulating tool can be controlled from the master arm by the operator, a bag of flexible material enclosing the slave arm of the manipulator, said bag being attached at one of its ends adjacent the through-tube and being attached at its other end to the tool receiving means, a releasable connection between the tool receiving means and the slave arm and means for actuating the releasable connection so that the slave arm of the manipulator can be withdrawn from the bag which remains attached at said other end to the tool receiving means.

11. Apparatus as claimed in claim 10, comprising a pair of tool receiving members each having a part connected to a part of the slave arm, and wherein the releasable connection for each tool receiving member comprises a stud on one of said parts entering a recess in the part to which it is connected, locking means for locking said stud in said recess, means for detachably securing a portion of a tool to each of said tool receiving members and means for locking the tool in the attached position.

12. Apparatus as claimed in claim 11, wherein the detachable connection between the tool receiving members and the tool parts comprise key and slot connections and a locking pin for holding said tools secured to said tool receiving members.

13. Manipulating apparatus comprising a through-tube, a master arm and a slave arm positioned at opposite ends thereof and operatively connected to each other through said through tube, a manipulating tool carried by said slave arm, control means connected to said master arm by means of which said master and slave arms can be manipulated by an operator to move th manipulating tool carried by the slave arm, a flexible bag enclosing the slave arm, said bag being attached at one end adjacent the through tube and at its other end to said manipulating tool, a releasable connection between the slave arm and manipulating tool, and means for actuating said releasable connection so that the slave arm of the manipulator can be withdrawn from the bag, which then remains attached to said manipulating tool.

14. Apparatus as claimed in claim 13, in which said manipulating tool comprises two relatively movable parts and said slave arm carries actuating mechanism therefor, and the end of the bag attached to the tool is formed with two finger portions open at their extremities each of which fits over the mechanism actuating one part of the manipulating tool.

15. Apparatus as claimed in claim 13, in which the releasable connection between the slave arm and the manipulating tool comprises spring pressed members which are normally urged by spring pressure to a position in which they hold said slave arm and manipulating tool in interlocking relationship but which can be operated so as to enable the slave arm actuating mechanism to be disconnected from the manipulating tool.

References Cited in the file of this patent

UNITED STATES PATENTS

| 2,476,249 | Payne | July 12, 1949 |
| 2,771,199 | Jelatis | Nov. 20, 1956 |
| 2,774,488 | Goertz et al. | Dec. 18, 1956 |
| 2,861,701 | Bergsland et al. | Nov. 25, 1958 |